United States Patent
Klinger

(10) Patent No.: US 9,908,518 B2
(45) Date of Patent: Mar. 6, 2018

(54) HYDRAULIC BRAKE SYSTEM

(71) Applicant: AUDI AG, Ingolstadt (DE)

(72) Inventor: Thomas Klinger, Ingolstadt (DE)

(73) Assignee: AUDI AG, Ingolstadt (DE)

(*) Notice: Subject to any disclaimer, the term of this patent is extended or adjusted under 35 U.S.C. 154(b) by 124 days.

(21) Appl. No.: 14/061,145

(22) Filed: Oct. 23, 2013

(65) Prior Publication Data
US 2014/0110996 A1    Apr. 24, 2014

(30) Foreign Application Priority Data
Oct. 24, 2012  (DE) .................. 10 2012 020 879

(51) Int. Cl.
*B60T 13/10*   (2006.01)
*B60T 13/16*   (2006.01)
*B60T 8/26*    (2006.01)

(52) U.S. Cl.
CPC ........... *B60T 13/161* (2013.01); *B60T 8/267* (2013.01)

(58) Field of Classification Search
CPC ...... B60T 13/74; B60T 13/586; B60T 13/745; B60T 7/12; B60T 7/042; B60T 7/107; B60T 8/26; B60T 8/4266; B60T 11/224; B60T 2270/60; B60T 2270/608; B60L 7/26
USPC .................. 303/115.2; 188/345; 60/545, 562
See application file for complete search history.

(56) References Cited

U.S. PATENT DOCUMENTS

| | | | |
|---|---|---|---|
| 2,317,604 A * | 4/1943 | Hamilton ....................... | 188/349 |
| 4,093,313 A | 6/1978 | Burckhardt | |
| 4,270,806 A * | 6/1981 | Venkataperumal et al. ...... | 303/3 |
| 4,425,005 A * | 1/1984 | Warwick ........................... | 303/3 |
| 4,861,117 A * | 8/1989 | Reinartz et al. ........... | 303/113.3 |
| 5,421,643 A | 6/1995 | Kircher et al. | |
| 6,079,792 A * | 6/2000 | Kessler ........................... | 303/7 |
| 2012/0053803 A1* | 3/2012 | Ueno .................... | B60T 8/1708 701/70 |
| 2012/0091788 A1 | 4/2012 | Welberle Et At | |
| 2013/0169032 A1 | 7/2013 | Linhoff | |

FOREIGN PATENT DOCUMENTS

| | | |
|---|---|---|
| DE | 26 25 713 | 12/1977 |
| DE | 42 39 386 | 5/1994 |
| DE | 102006050277 | 4/2008 |
| DE | 102009048785 | 4/2011 |
| DE | 102010024734 | 5/2011 |
| DE | 102010008018 | 8/2011 |
| DE | 102011017595 | 10/2011 |
| DE | 102010042363 | 4/2012 |
| EP | 0 376 767 | 7/1990 |
| WO | WO 2010/088920 | 8/2010 |

* cited by examiner

*Primary Examiner* — Bradley T King
*Assistant Examiner* — Stephen M Bowes
(74) *Attorney, Agent, or Firm* — Henry M. Feiereisen LLC

(57) ABSTRACT

A hydraulic brake system includes two brake circuits, a tandem master brake cylinder which is connected to the two brake circuits and includes a float piston, and a means for adjusting a position of the float piston, wherein a defined distribution of brake power between the two brake circuits is commensurate with the position of the float piston.

4 Claims, 2 Drawing Sheets

HYDRAULIC BRAKE SYSTEM

CROSS-REFERENCES TO RELATED APPLICATIONS

This application claims the priority of German Patent Application, Serial No. 10 2012 020 879.0, filed Oct. 24, 2012, pursuant to 35 U.S.C. 119(a)-(d), the disclosure of which is incorporated herein by reference.

BACKGROUND OF THE INVENTION

The present invention relates to a hydraulic brake system.

The following discussion of related art is provided to assist the reader in understanding the advantages of the invention, and is not to be construed as an admission that this related art is prior art to this invention.

It is desired that the axle on which the electric machine is located, maximally recoups energy during a braking process. This means that a mechanical, in particular hydraulic, brake system which is connected in parallel to the electric machine is to brake as little as possible in this operating condition to convert an as great as possible portion of the braking energy into electric energy. However, for a variety of reasons the recouping capacity of the system which consists of the electric machine and the connected energy accumulator is variable. The recouping capacity depends for example on the charge state of the battery or the temperature of the electric machine. The brake system therefore has to be "blending-enabled", i.e. the brake power has to be capable of being distributed between the hydraulic brake system and the brake power generated by recouping.

From DE 10 2009 048 785 A1 a motor vehicle with a hydraulic drive is known which has an electric machine for recouping energy. The hydraulic brake system has a pressure-reduction valve device to lower the pressure generated by the hydraulic brake system in the recouping phase.

It is also known to use a brake power assist unit and as the case may be a hydro-aggregate, i.e, a block with valves and a pump, in order to obtain a blending-enabled brake system. However, it is difficult to configure these components so that a blending process is not perceived by the driver. Achieving this requires that the pedal force and the pedal travel perform like in a conventional braking process during a recouping.

It would therefore be desirable and advantageous to provide a blending-enabled brake system, wherein a changed distribution of the brake power is not to be perceived by the driver

SUMMARY OF THE INVENTION

According to one aspect of the present invention, a hydraulic brake system includes two brake circuits, a tandem master brake cylinder connected to the two brake circuits and including a float piston, and a means for adjusting a position of the float piston, wherein a defined distribution of brake power between the two brake circuits is commensurate with the position of the float piston.

The invention is based on the recognition that the brake-power distribution between the two braking circuits can be directly influenced by means of a controllable float piston. Accordingly, the brake power can for example be distributed during recouping so as to avoid an undesired excessive braking of the axle on which the electric machine is located. For this, the float piston is only displaced so far that the displacement corresponds to the desired pressure differential. According to the invention the position of the float piston is thus controlled.

According to another advantageous feature of the invention the means for adjusting the position of the float piston can be constructed as a coil or a magnet, wherein the float piston is made of a material so as to be displaceable by a magnetic field generated by the coil or the magnet. A magnetic field can be generated by means of the coil by applying a current which exerts a force on the magnetic material thereby displacing the float piston in the desired direction. It is also possible to displace the float piston back into the starting position by reversing the magnetic field. By changing the strength of the magnetic filed the displacement travel of the float piston may also be controlled. A return of the float piston from the extended position into its starting position can however also be caused by means of a restoring spring.

According to another advantageous feature of the invention, the coil can be arranged so as to a defined displacement of the float piston and with this a defined displacement travel which can be adjusted by adjusting the length of the coil.

The strength of the magnetic field can also be influenced in order to cause different displacements of the float piston by magnetic fields of different strengths and as a result different pressure differentials in the tandem master brake cylinder.

According to another advantageous feature of the invention, the float piston can have an end section which protrudes out of the pressure chamber, to which end section a controllable actuator for adjusting a defined pressure differential is connected. The actuator is coupled with the float piston and displaces the float piston, thereby resulting in a defined pressure differential in the two brake circuits which are connected to the tandem master brake cylinder.

According to another advantageous feature of the invention the controllable actuator can be constructed as electromotor possibly with a reduction-gear ratio. By means of the controllable actuator the brake power can be influenced and distributed between the two brake circuits.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
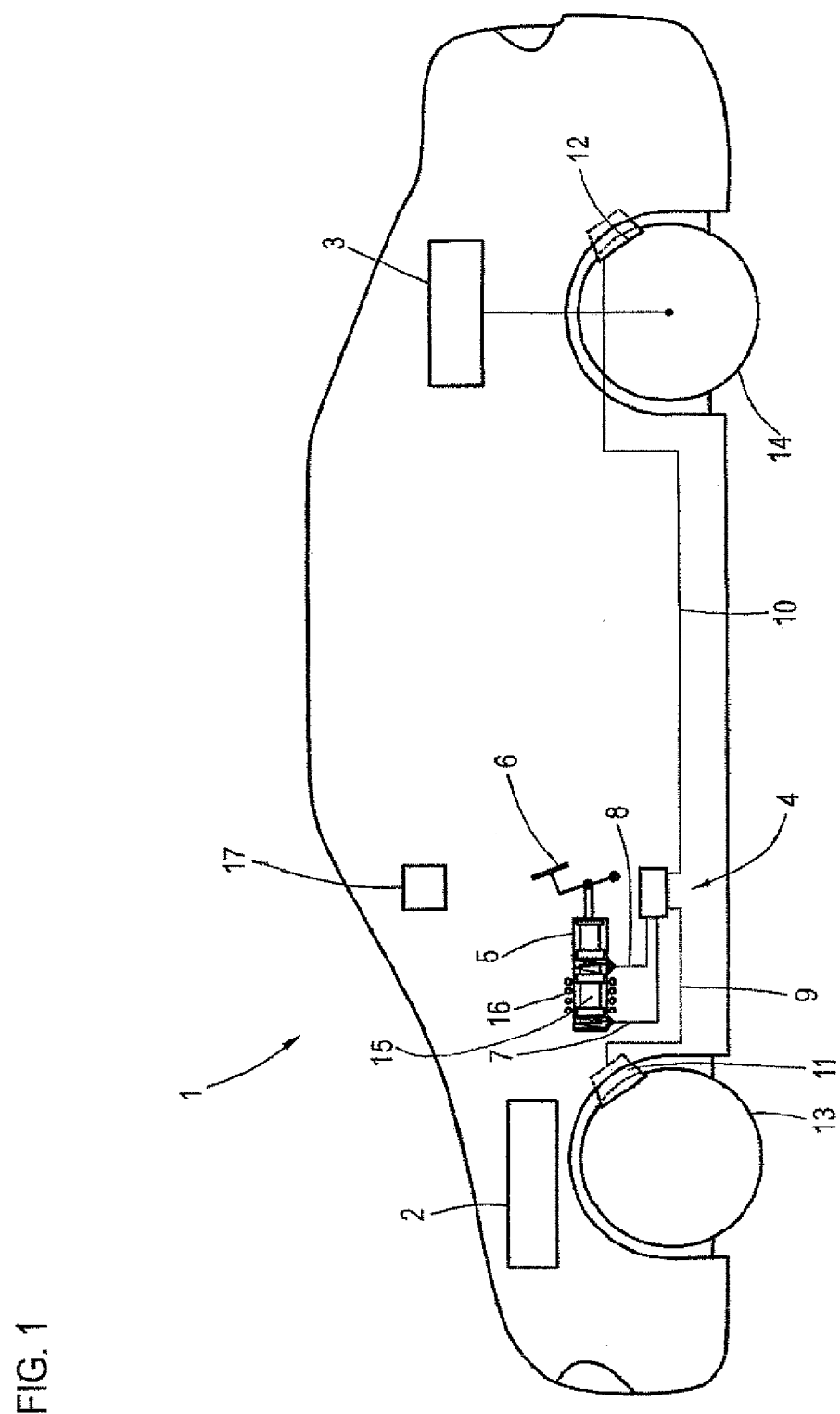
FIG. 1 is a schematic representation of a first exemplary embodiment of a motor vehicle with a hydraulic brake system according to the invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a motor vehicle 1 which includes a motor 2 and an electric machine 3. The electric machine 3 can be operated to drive a wheel or the wheels of an axle, as an alternative the electric machine 3 can also be operated as generator to recoup energy. During recouping the electric machine generates electric current which is stored in an energy accumulator and can be used at a later point in time for driving a wheel or an axle of the motor vehicle 1 or for electric consumers.

The motor vehicle 1 includes a hydraulic brake system 4 with a tandem master brake cylinder 5. A brake pedal 6 is directly connected with the tandem master brake cylinder 5 or via a brake force amplifier, when actuating the brake pedal 6 two pressure pistons in the interior of the tandem main brake cylinder 5 are displaced whereby a hydraulic pressure is generated in the hydraulic lines 7, 8. The hydraulic lines 9, 10 each lead into a brake caliper 11, 12, a cylinder which is integrated in the brake caliper 11, 12 is displaced by the hydraulic pressure whereby brake linings are pressed against a brake disc of a wheel 13, 14. Overall, four hydraulic lines 9, 10 are present wherein each hydraulic line is associated with one wheel.

A float piston 15 in the tandem master brake cylinder 5 is made of a magnetic material. The tandem master brake cylinder 5 is surrounded by a coil 16. By means of a control device 17 a current is applied to the coil 16 thereby generating a magnetic field which exerts a force on the float piston 15. Under the influence of the magnetic field the float piston is displaced, whereby the pressure in the hydraulic lines 7, 8 is changed. Correspondingly, the brake force acting on the wheels 13, 14 also changes.

During a recouping, the magnetic field is generated by the control device 17, wherein the magnitude and direction of the displacement is selected so that the rear axle or the rear wheel 14 is decelerated to a lesser degree than it would be based on the installed brake power distribution because during the recouping the electric machine which is operated as generator also generates a corresponding brake moment or recouping moment. Besides this, other exemplary embodiments are conceivable in which the braking of the front axle is modified.

After the recouping, the coil 16 is turned off so that the float piston 15 returns into its starting position under the influence of a return spring (not shown).

Figure 2:
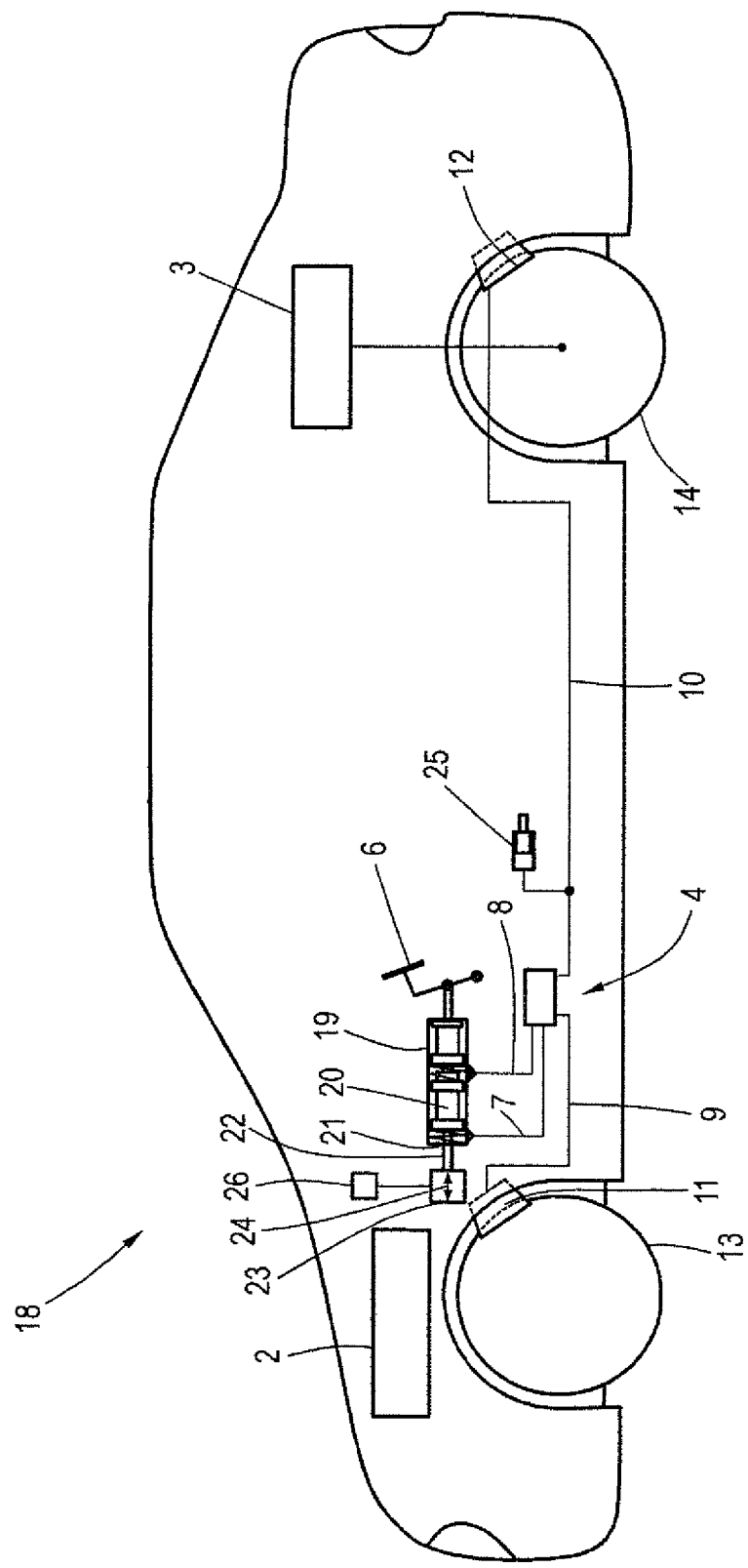
FIG. 2 is a schematic representation of a second exemplary embodiment of a motor vehicle with a hydraulic brake system according to the invention.

FIG. 2 shows a second exemplary embodiment of the invention, wherein corresponding components are designated with the same reference numerals as in FIG. 1. A repeated description of the corresponding components is not give.

The motor vehicle 18 shown in FIG. 2 has a tandem master brake cylinder 19 whose float piston 20 is extended so that it protrudes out of the pressure chamber. The housing of the tandem master brake cylinder 19 is additionally provided with a sealing 21. An end section 22 of the tandem master brake cylinder 19 is coupled with an actuator 23 which in the shown exemplary embodiment is configured as electromagnetic actuator. The double arrow 24 shows the direction of movement of the actuator 23 which is capable to move the float piston 20 axially. The actuator 23 is controlled by a control device 26. During the recouping, the control device 26 controls the actuator so that the pressure in the hydraulic lines 7, 8 is changed so that the wheel 14 which is arranged on the recouping axle (rear axle) is hydraulically decelerated to a lesser degree.

By means of the controllable float piston 20, the brake power distribution between the two brake circuits can be directly influenced. The actuator displaces the float piston 20 commensurate with the desired pressure differential.

In addition a piston 25 is provided in the hydraulic brake circuit as means for influencing the volume of the brake fluid. This allows preventing change of the position of the brake pedal 6 or the pedal travel.

In the exemplary embodiments shown in FIGS. 1 and 2 the tandem master brake cylinder 5, 19 is controlled so that the total brake power generated by the recouping and the hydraulic brake system remains constant. By means of the controllable float piston 15, 20 any desired degrees of recouping are possible without change of the brake power distribution. The goal is also that the driver can recognize a recouping process by way of the brake pedal or a reaction of the motor vehicle.

Beside this preferred control, other brake power distributions may also be realized depending on the driving situation.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A motor vehicle, comprising:
   a motor;
   an electrical machine operated to drive a wheel of a recouping axle and also operated as a generator to recoup energy so that during recouping it generates a current; and
   a hydraulic brake system, comprising:
   two brake circuits,
   a tandem master brake cylinder connected to the two brake circuits and comprising a float piston made of a magnetic material,
   a coil arranged relative to the float piston for adjusting a position of the float piston in response to a magnetic field generated by the coil by applying the current to the coil thereby generating the magnetic field such that its force is variable, and
   a control device configured to adjust the position of the float piston as a function of a desired defined distribution of brake power between the two brake circuits by controlling the magnetic field of the coil, said defined distribution of brake power between the two brake circuits being commensurate with the position of the float piston,
   wherein said control device is configured to generate the magnetic field for a magnitude and a direction of displacement of the float piston in the tandem master brake cylinder such that the wheel arranged on the recouping axle is decelerated to a lesser degree during the recouping because said electrical machine is operated as a generator and generates a corresponding brake moment which is a recouping moment, and at the same time the tandem master brake cylinder is controlled so that a total brake power generated by the recouping and the hydraulic brake system remains constant, and the float piston is controlled by said control device so that any desired degrees of recouping are possible without change of a brake power distribution.

2. The motor vehicle of claim 1, wherein the coil is arranged around a pressure chamber of the tandem master brake cylinder.

3. The motor vehicle of claim 1, wherein the magnetic field is of a strength so as to cause a defined displacement of the float piston resulting in a defined pressure differential in the tandem master brake cylinder.

4. The motor vehicle of claim 1, wherein the coil is arranged so as to cause a defined displacement of the float piston resulting in a defined pressure differential in the tandem master brake cylinder.

\* \* \* \* \*